United States Patent
Kai (10) Patent No.: US 7,812,759 B2
(45) Date of Patent: Oct. 12, 2010

(54) RADAR APPARATUS FOR DETECTION POSITION INFORMATION OF A TARGET BY RECEIVING REFLECTION SIGNALS REFLECTED BY THE TARGET WITH A PLURALITY OF RECEPTION ANTENNAS

(75) Inventor: Koichi Kai, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 228 days.

(21) Appl. No.: 12/107,546

(22) Filed: Apr. 22, 2008

(65) Prior Publication Data

US 2009/0322592 A1 Dec. 31, 2009

(30) Foreign Application Priority Data

Jan. 10, 2008 (JP) .............................. 2008-003347

(51) Int. Cl.
G01S 13/42 (2006.01)
G01S 13/58 (2006.01)

(52) U.S. Cl. .................................................. 342/107
(58) Field of Classification Search ................. 342/107, 342/108
See application file for complete search history.

(56) References Cited

U.S. PATENT DOCUMENTS

2005/0156780 A1* 7/2005 Bonthron et al. ............ 342/107
2005/0225481 A1* 10/2005 Bonthron .................... 342/175
2009/0322592 A1* 12/2009 Kai ............................ 342/107

FOREIGN PATENT DOCUMENTS

| JP | 2001-91617 A | 4/2001 |
| JP | 2002-131420 A | 5/2002 |
| JP | 2004198312 | 7/2004 |

OTHER PUBLICATIONS

Ralph O. Schmidt, "Multiple Emitter Location and Signal Parameter Estimation", IEEE Transactions on Antennas and Propagation, Mar. 1986, pp. 276-280, vol. AP-34, No. 3.
Japanese Office Action dated Mar. 2, 2010.

* cited by examiner

*Primary Examiner*—Dan Pihulic
(74) *Attorney, Agent, or Firm*—Sughrue Mion, PLLC (57) ABSTRACT

A radar apparatus includes a DBF process portion for grouping reception signals over plural channels into plural groups and performing DBF on each group, a summing portion for summing amplitudes or power of frequency components obtained by the DBF performed by the DBF process portion on each group, a peak detecting portion for detecting a peak frequency of a signal of the electric wave reflected by a target from results of the summation at the summing portion, a distance/speed calculating portion for calculating the distance and speed of the target based on the peak frequency, and an angle calculating portion for extracting a frequency component of the peak frequency detected by the peak detecting portion to calculate the angle of the electric wave reflected by the target. Thus, the amount of DBF calculation can be reduced, and a highly accurate positional information of the target can be obtained.

7 Claims, 9 Drawing Sheets

RADAR APPARATUS FOR DETECTION POSITION INFORMATION OF A TARGET BY RECEIVING REFLECTION SIGNALS REFLECTED BY THE TARGET WITH A PLURALITY OF RECEPTION ANTENNAS

BACKGROUND OF THE INVENTION

1. Field of the Invention

The present invention relates to a radar apparatus for detecting position information of a target by receiving reflection signals reflected by the target (object) with a plurality of reception antennas.

2. Description of the Related Art

There are known methods for synthesizing an antenna beam by executing digital beam forming on beat signals obtained by a plurality of reception units of a radar apparatus carrying an antenna array including a plurality of reception antenna elements.

For example, JP-A-2001-91617 discloses "a target azimuth detecting apparatus having digital beam forming means for estimating the range of the azimuth of a target using a digital beam forming technique and high-resolution azimuth estimation means for detecting the azimuth of the target by using a high-resolution azimuth detection technique on the estimated azimuth range of the target or a region including the neighborhood of the same".

JP-A-2001-91617 discloses that "the azimuth of a target can be accurately detected while preventing erroneous detection by a combination of accurate determination of the presence of the target using a digital beam forming (hereinafter also referred to as DBF) technique and accurate detection of the azimuth of the target using the high-resolution azimuth detection technique".

Specifically, JP-A-2001-91617 describes that an accurate azimuth angle of a target can be obtained by performing DBF on signals obtained by a plurality of reception units (hereinafter referred to as reception channels) to calculate the angle of the target approximately and using more accurate angle measuring means in the neighborhood of the angle obtained by DBF.

In the case of a radar apparatus utilizing DBF as disclosed in JP-A-2001-91617, a higher S/N ratio is achieved, the greater the number of reception channels provided for synthesis using DBF. Thus, higher target detecting performance can be achieved, and resultant synthesized beams become thinner.

The angular resolution of a beam will be higher, the thinner the beam is. However, a great number of beams may be required to obtain a desired range of detection angles, which results in the problem of an increase in the amount of calculation.

SUMMARY OF THE INVENTION

The invention was made to resolve the above-described problem, and it is an object of the invention to provide a radar apparatus in which the amount of calculation for DBF can be reduced and which can provide a highly accurate positional information of a target.

A radar apparatus according to the invention is a radar apparatus includes a transmission unit for transmitting an electric wave to a target and a reception unit for obtaining reception signals over a plurality of channels from an electric wave reflected by the target with an antenna array having a plurality of antenna elements. The apparatus includes a digital beam forming unit for grouping reception signals over the plurality of channels into a plurality of groups and performing digital beam forming on each of the groups, a summing portion for summing amplitudes or power of frequency components as a result of the digital beam forming performed by the digital beam forming unit on each of the groups, a peak detecting portion for detecting a peak frequency of a signal of the electric wave reflected by a target from results of the summation at the summing portion, a distance/speed calculating portion for calculating the distance and speed of the target based on the peak frequency obtained by the peak detecting portion, and an angle calculating portion for extracting a frequency component of the peak frequency detected by the peak detecting portion to calculate the angle of the electric wave reflected by the target.

Therefore, the invention makes it possible to reduce the amount of calculation required for digital beam forming and to obtain a highly accurate positional information of a target.

The foregoing and other objects, features, aspects and advantages of the present invention will become more apparent from the following detailed description of the present invention when taken in conjunction with the accompanying drawings.

DETAILED DESCRIPTION OF THE INVENTION

Embodiments of the invention will now be described based on the drawings.

Embodiment 1

Figure 1:
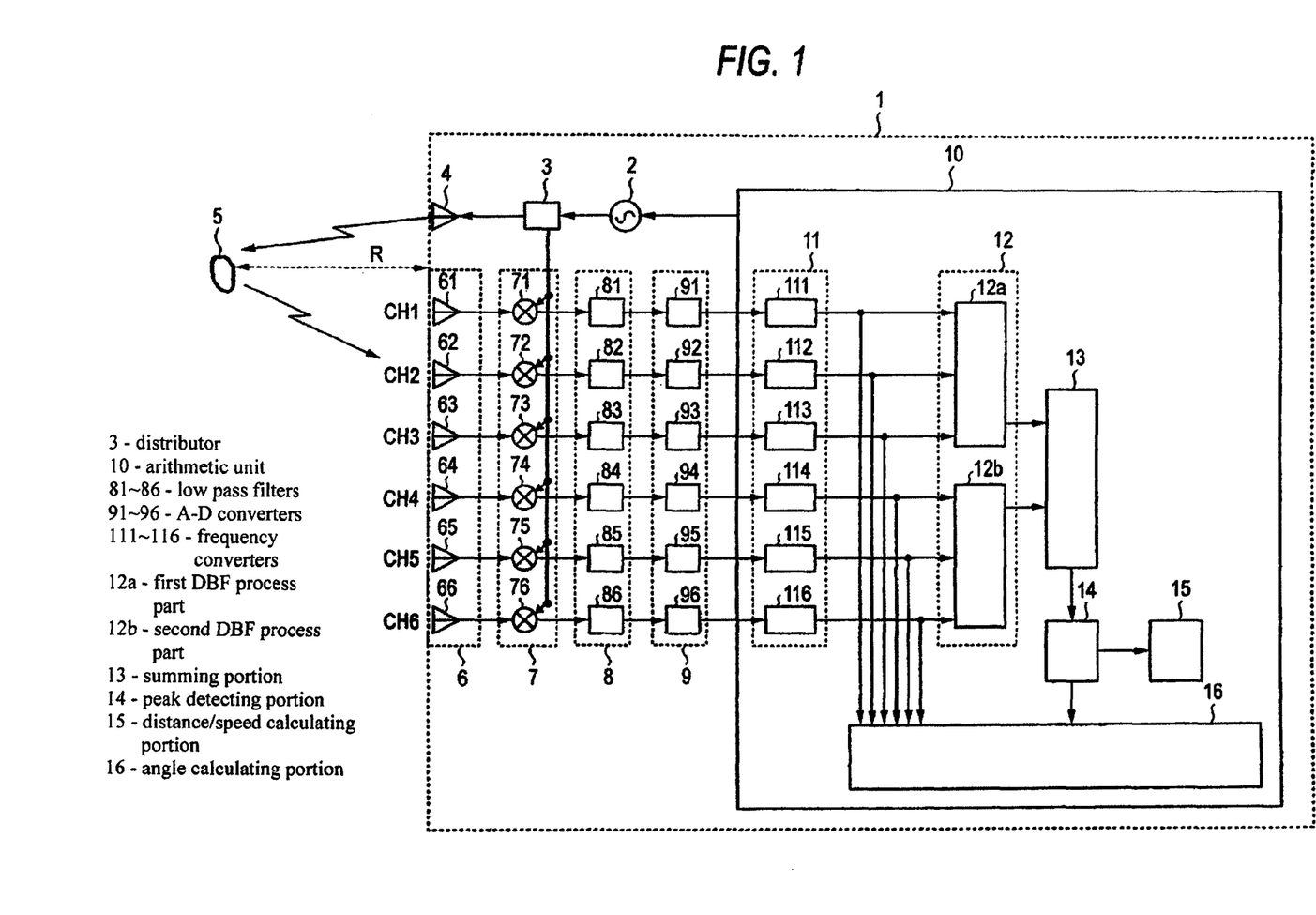
FIG. 1 is a block diagram showing a configuration of a radar apparatus according to Embodiment 1.

FIG. 1 is a block diagram showing a configuration of a radar apparatus according to Embodiment 1 of the invention. In FIG. 1, reference numeral 1 represents an FMCW (Frequency Modulated Continuous Wave) radar apparatus (hereinafter simply called a radar apparatus). Reference numeral 2 represents a voltage-controlled oscillator which generates an electromagnetic wave having a particular frequency. Reference numeral 3 represents a distributor for distributing the power of the electromagnetic wave from the voltage-controlled oscillator 2 to a transmission antenna 4 and a mixer unit 7 at a receiving end. The transmission antenna 4 transmits the electromagnetic wave from the distributor 3 in the air.

Reference numeral 5 represents a target (object) of detection by the radar apparatus 1, and reference numeral 6 represents a reception antenna unit including a plurality of reception antennas for receiving an electromagnetic wave returned from the target 5 as a result of reflection of the transmitted electromagnetic wave.

In the present embodiment, for example, the reception antenna unit 6 includes six reception antennas (61, 62, ..., 66) associated with channels CH(channel)1 to CH6.

While the reception antennas (61, 62, ..., 66) are disposed in a straight line at constant intervals d, it is not essential to dispose the reception antennas at equal intervals or in a straight line.

Reference numeral 7 represents a mixer unit for mixing the electromagnetic wave from the distributor 3 and reception waves obtained by the reception antennas of the reception antenna unit 6 to output a beat signal which depends on the distance, relative speed, and angle of the target 5. Reference numeral 8 represents a low-pass filter unit.

Although an amplifier is normally provided in each path of transmission or reception according to the frequency thereof, it is omitted in the illustration.

Reference numeral 9 represents an A-D converter unit for converting a beat signal into a digital signal.

Reference numeral 10 represents an arithmetic unit for calculating the distance, relative speed, and angle of the target 5 based on the signal from the A-D converter unit 9 and controlling FM modulation (up modulation or down modulation which will be described later) at the voltage-controlled oscillator 2.

The mixer unit 7 includes six mixers (71, 72, ..., 76) associated with the channels CH1 to CH 6. The low-pass filer unit 8 includes six low-pass filters (81, 82, ..., 86) associated with the channels CH1 to CH6. The A-D converter unit 9 includes six A-D converters (91, 92, ..., 96) associated with the channels CH1 to CH6.

The arithmetic unit 10 has incorporated therein a frequency converting portion 11 (including six frequency converters 111, 112, ..., 116) for converting the frequency of the beat signal of each channel which has been digital-converted by the respective A-D converters of the A-D conversion unit 9, a DBF process portion 12 for performing a DBF process based on results of frequency conversion of channels CH1 to CH3 or CH4 to CH6, a summing portion 13 for summing the amplitudes or power of frequency components obtained by DBF on the channels CH1 to CH3 or DBF on the channels CH4 to CH6, a peak detecting portion 14 for extracting a peak from the result obtained by the summing portion 13, a distance/speed calculating portion 15 for calculating the distance and speed based on the peak frequency obtained by the peak detecting portion 14, and an angle calculating portion 16 for extracting a frequency component corresponding to the peak frequency obtained by the peak detecting portion 14 from results of the process at the frequency converting portion 11 and performing an ultra-resolution process such as MUSIC (Multiple Signal Classification).

The DBF process portion 12 includes a first DBF process part 12a for performing a DBF process based on results of frequency conversion of the channels CH1 to CH3 and a second DBF process part 12b for performing a DBF process based on results of frequency conversion of the channels CH4 to CH6. That is, FIG. 1 shows a case in which the digital beam forming means 12 groups signals received over a plurality of channels into two groups and in which digital beam forming is performed for each of the groups thus provided.

Figure 2:
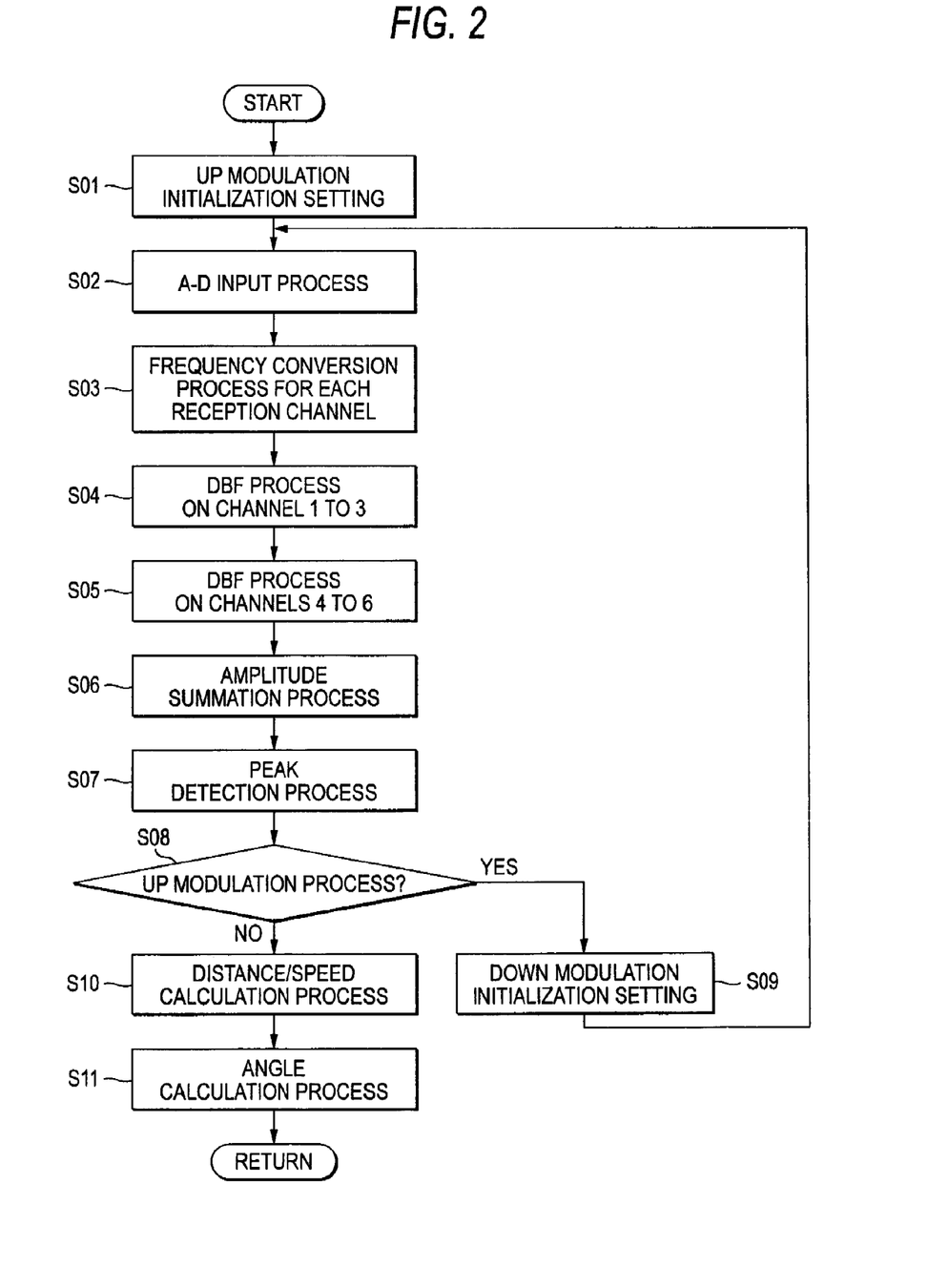
FIG. 2 is a flow chart for explaining operations of the radar apparatus of Embodiment 1.

Details of signal processing at the radar apparatus of the present embodiment will now be described with reference to the flow chart shown in FIG. 2.

First, initialization setting is made for a case in which a transmission frequency is increased (hereinafter referred to as UP modulation) at step S01.

Subsequent processes up to step S08 are processes of UP modulation.

Next, an A-D input process is performed at step S02 to convert the beat signal in each reception channel into a digital signal at constant time intervals using the A-D converter unit 9.

Next, at step S03, a frequency conversion process is performed by the frequency conversion unit 11 on the result of the A-D input process for each reception channel.

The step employs a fast Fourier transformation (FFT) process.

Next, at step S04, a DBF process is performed on each frequency component which is identical between results of FFT on the channels CH1 to CH3.

Next, at step S05, a DBF process is performed on each frequency component which is identical between results of FFT on the channels CH4 to CH6.

The amounts of phase-shifts and the number of beams processed at this time will be described later in detail.

Next, at step S06, the amplitude of each frequency of results of DBF on the channels CH1 to CH3 is calculated, and the amplitude of each frequency of results of DBF on the channels CH4 to CH6 is calculated. An amplitude summing process is performed for each frequency.

Next, a peak detection process is performed for each beam at step S07.

Figure 3:
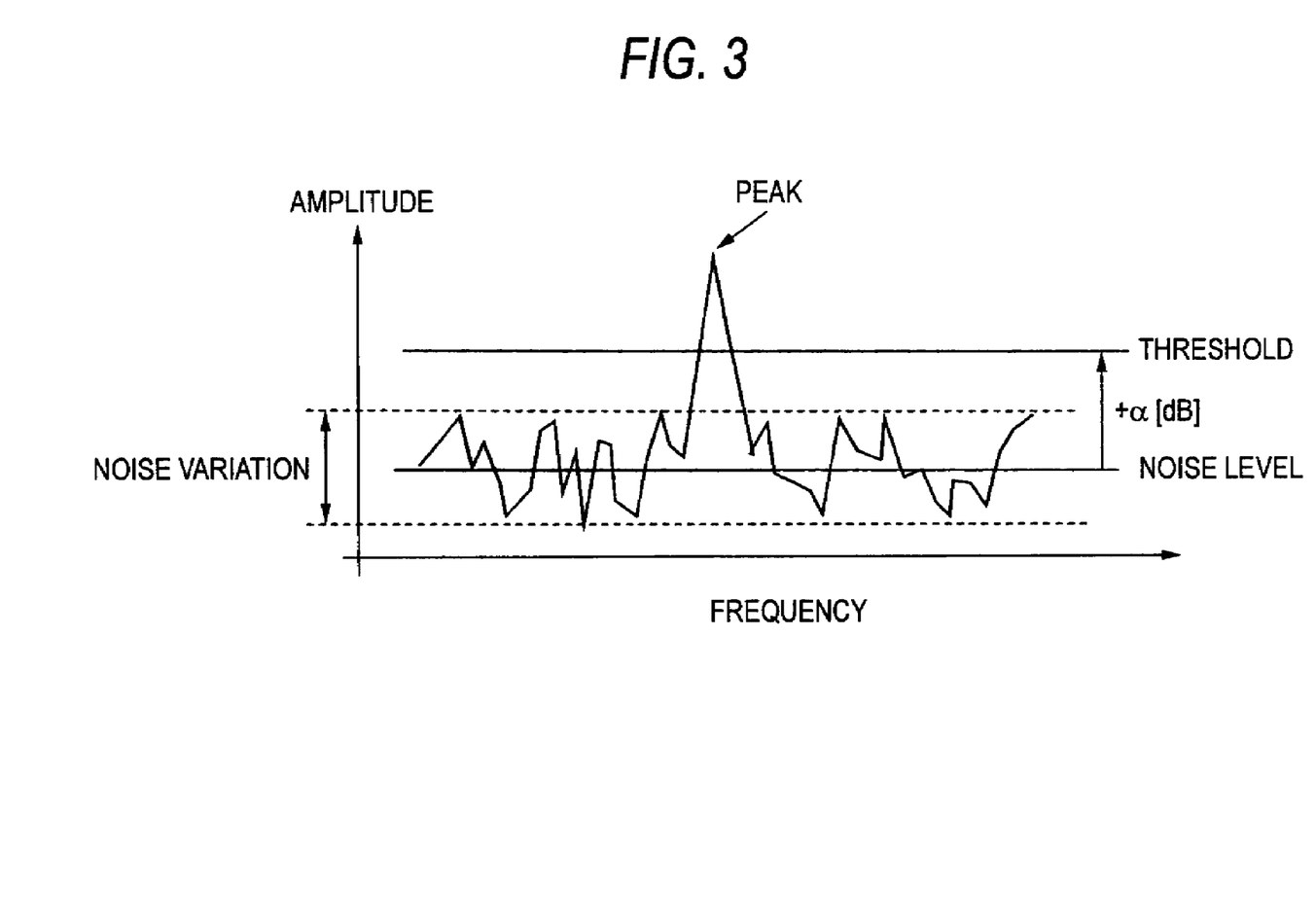
FIG. 3 is a graph for schematically explaining a peak detecting process of Embodiment 1.

FIG. 3 is a graph for schematically explaining the peak detection process.

In FIG. 3, the horizontal axis represents a frequency obtained from a frequency analysis, and the vertical axis represents the amplitude of each frequency component.

A threshold [dB] is set by adding something to the average of noise levels shown in FIG. 3, and a maximum value exceeding the threshold is selected. The maximum value constitutes a detected peak.

The probability of detecting a peak resulting from noise will be smaller, the greater the threshold. However, a reduction also occurs in the probability of detecting a peak resulting from a signal of a wave reflected from a target. An optimal threshold is therefore determined according to the use of the radar.

Next, it is determined at step S08 whether UP modulation is currently in progress. Step S09 is executed if UP modulation is in progress, and step S10 is executed if the process is not UP modulation.

At step S09, initialization setting is made for a case in which the transmission frequency is decreased (hereinafter referred to as DOWN modulation). Step S02 is then executed. Subsequent steps up to step S08 will be processes for DOWN modulation.

At step S10, the distance and relative speed of the target are calculated from peak frequencies obtained by the UP modulation and DOWN modulation.

"Methods of calculating distance and speed" for the FMCW radar apparatus will not be described here because they have already been described in various articles.

Next, at step S11, peak frequency data of each reception channel are extracted for each peak frequency obtained at step S07 from results of the frequency conversion at step S03.

The angle of the target is calculated from the peak frequency data of each reception channel thus extracted by performing an ultra-resolution process such as MUSIC or monopulse angle measurement.

Various articles have been published on the "MUSIC process" including the non-patent document cited below, and the "mono-pulse angle measurement" is a common radar technique (see JP-A-2003-248054, for example). Therefore, no description will be made on them.

Non-Patent Document: Ralph O. Schmidt: "Multiple Emitter Location and Signal Parameter Estimation", IEEE TRANSACTIONS ON ANTENNAS AND PROPAGATION, VOL. AP-34, No. 3, MARCH 1986, P. 276-280

A detailed description will now be made on processes from the DBF process at step S04 up to the amplitude summing process at step S06.

Figure 4:
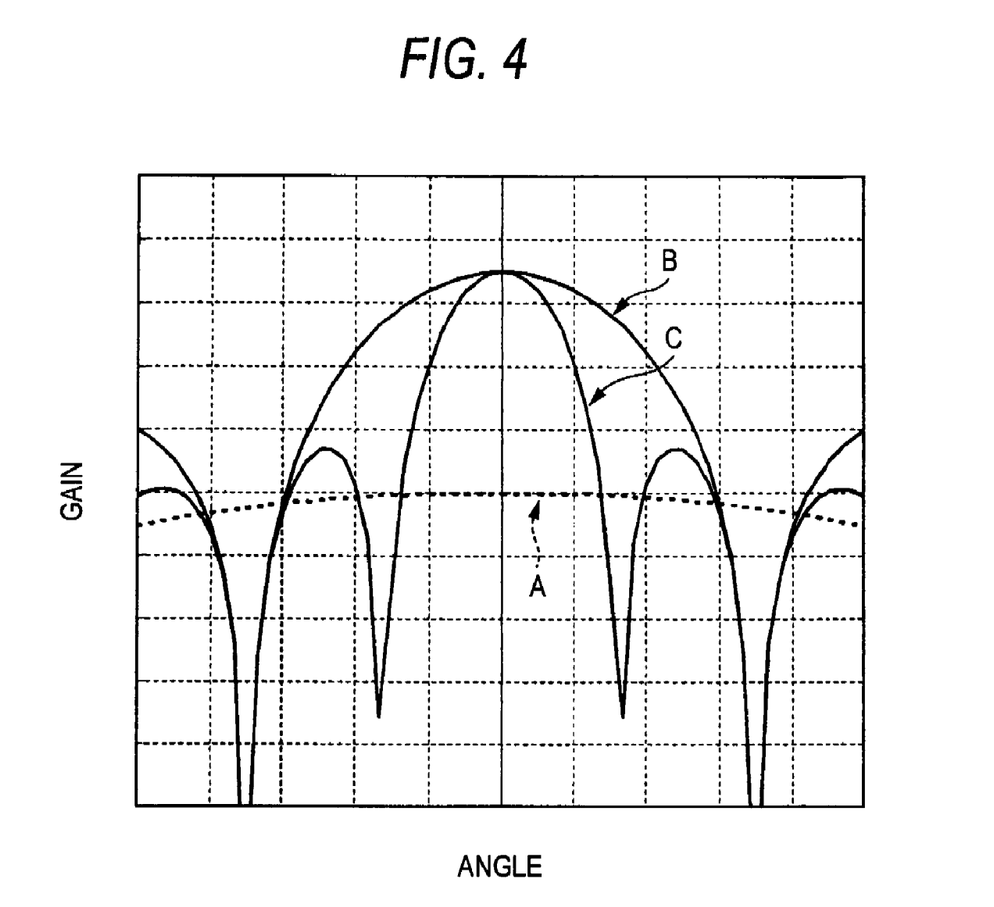
FIG. 4 is an illustration showing an antenna pattern and beam patterns.

FIG. 4 is a diagram showing a graph showing an antenna pattern A of each reception channel, a beam pattern B obtained by performing an amplitude summing process after DBF on each group of three channels (that is, a beam pattern obtained by processing of Embodiment 1), and a beam pattern C obtained by performing DBF using all of the six channels.

The beam direction was 0 (the amount of a phase shift in each reception channel was 0) for either of the DBF processes (i.e., either DBF performed on the beam pattern B or C).

The beam pattern B obtained by an amplitude summing process after performing DBF on each of two separate groups each having three channels has a beam width greater than that of the beam pattern obtained by performing DBF from the data of all of the six channels.

This holds true when the beam direction is other than 0.

Figure 5:
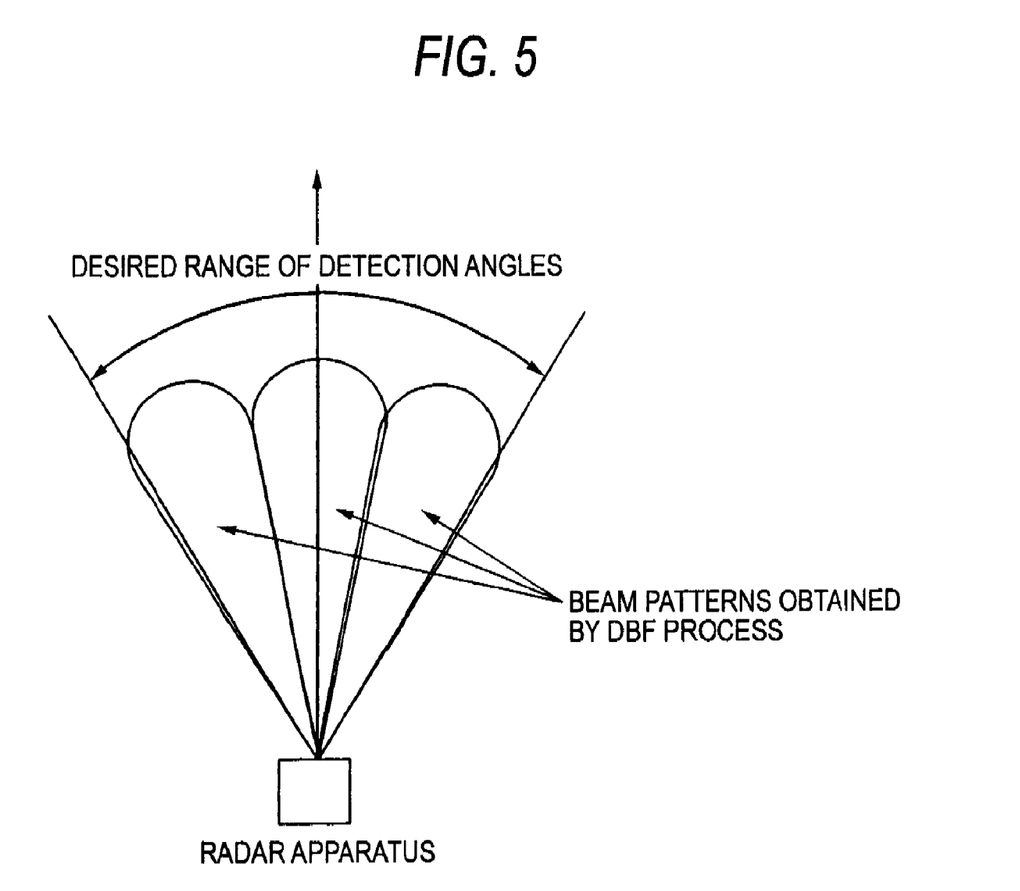
FIG. 5 is a graph showing the number of beams under signal processing in Embodiment 1.
Figure 6:
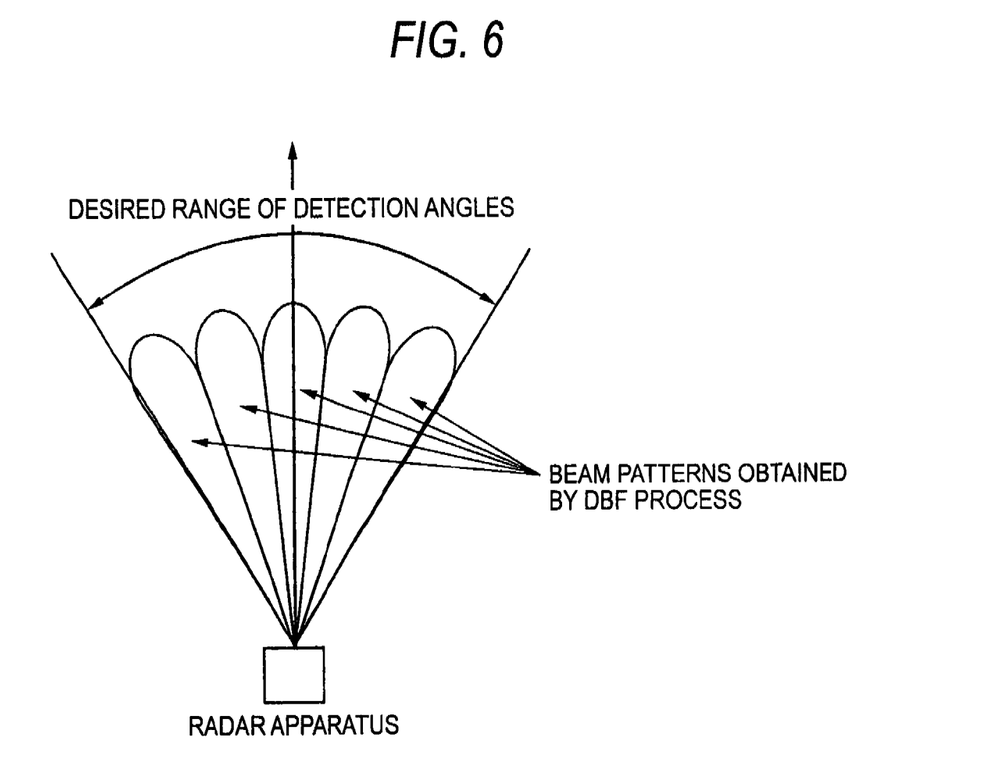
FIG. 6 is a graph showing the number of beams under DBF on all reception channels.

For example, in order to obtain a radar having a certain range of detection angles, three beams are required as shown in FIG. 5 when an amplitude summing process is performed after performing DBF on two separate groups each having three channels, whereas five beams are required as shown in FIG. 6 when DBF is performed from the data of all of the six channels.

The processes at steps S04 to S07 involve a smaller amount or number of calculations and therefore result in less loads of calculation processes in the radar apparatus as a whole, the smaller the number of beams.

When DBF is performed on n channels, the S/N of a beam in the frontal direction thereof is improved by about 10 log(n) [dB].

On the contrary, when an amplitude summing process is performed n times, no improvement is achieved in S/N because both of the peak level and noise level increase.

Figure 7:
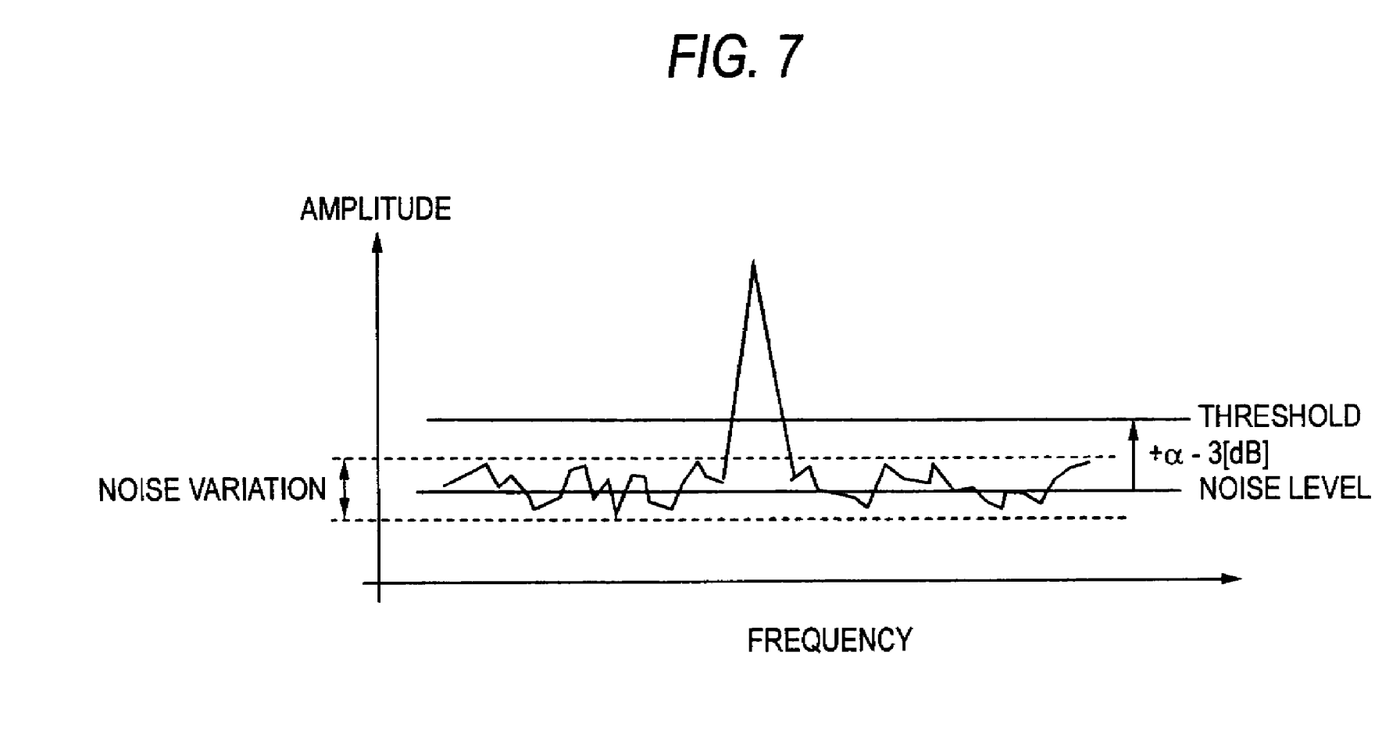
FIG. 7 is a method for a peak detecting process performed when a threshold is decreased by an amplitude summation process.

FIG. 7 is a graph for schematically explaining a peak detection process performed with a threshold which has been decreased by an amplitude summing process according to the preset embodiment.

In the present embodiment, variation of noises is leveled as shown in FIG. 7.

Therefore, a peak detection process can be performed after an amplitude summing process with a probability of erroneous detection similar to that of a peak detection process performed prior to an amplitude summing process by setting a threshold used for the peak detection process after the amplitude summing at approximate $1/\sqrt{n}$ of a threshold used for the peak detection process prior to the amplitude summing process.

"$\sqrt{n}$" equals "$n^{1/2}$".

As thus described, in the present embodiment, since a lower threshold can be used for peak detection, an improved probability of peak detection can be achieved. Specifically, it can be assumed that there is an improvement in S/N substantially equivalent to 20 log($\sqrt{n}$)=10 log(n)[dB].

Therefore, the summing process performed after DBF of each group of three channels provides peak detection performance (probability of detection and probability of erroneous detection) which can be substantially equivalent to that achieved by performing DBF based on the data of all of the six channels.

In the present embodiment, the number of channels to be subjected to DBF may be adjusted to allow the reception channels to be grouped accordingly depending on a desired range of detection angles, and the amplitude summing process may be performed on results of DBF on each of the groups. Thus, the amount of calculation can be reduced without reducing the effect of DBF in improving S/N.

In the present embodiment, the process of summing the amplitudes of frequency components may be replaced with a power summing process.

Although reception channels are grouped into groups each having three channels in the present embodiment, the grouping, DBF process, and the number of beams may be optimally selected according to a desired range of detection angles.

While Embodiment 1 of the invention has been described as a FMCW type radar apparatus, it is obvious that similar processes can performed in radar apparatus whose transmission frequency is not increased or decreased such as pulsed Doppler radars.

The DBF process may be replaced with a fast Fourier transform (FFT) process where reception channels are spaced at equal interval.

When intervals between antenna elements are partially unequal, the reception channels may be grouped to be equally spaced. Then, FFT may be performed on each group, and an amplitude summing process may be performed on results of FFT on each group.

Although the above description of the radar apparatus according to Embodiment 1 has been made using an example in which six reception channels are processed by grouping them into two groups, the invention is not limited to the number of reception channels and the number of groups provided in the example.

As described above, the radar apparatus of the present embodiment is a radar apparatus including transmission means (transmission antenna) 4 for transmitting an electric wave to a target 5 and reception means (reception antenna unit) 6 for obtaining reception signals over a plurality of channels from an electric wave reflected from the target with an antenna array having a plurality of antenna elements. The apparatus includes digital beam forming means (DBF process portion) 12 for grouping reception signals over the plurality of channels into a plurality of groups and performing digital beam forming on each of the plurality of groups, summing means (summing portion) 13 for summing amplitudes or power of frequency components obtained by the digital beam forming performed by the digital beam forming means (DBF process portion) 12 on each of the plurality of groups, peak detection means (peak detecting portion) 14 for detecting a peak frequency of a signal of the electric wave reflected by the target 5 from results of the summation at the summing means (summing portion) 13, distance/speed calculation means (distance/speed calculating portion) 15 for calculating the distance and speed of the target 5 based on the peak frequency obtained by the peak detection means (peak detecting portion) 14, and angle calculation means (angle calculating portion) 16 for extracting a frequency component of the peak frequency detected by the peak detection means (peak detecting portion) 14 to calculate the angle of the electric wave reflected by the target 5.

Thus, DBF is performed only to detect a target, and the angle calculation (computation) is performed by the angle calculation means. It is therefore possible to reduce the amount of calculation required for digital beam formation and to achieve a highly accurate positional information of a target.

Since the angle calculation means (angle calculating portion) 16 uses ultra-resolution angle measurement such as MUSIC to calculate the angle of an electric wave reflected by a target 5, a highly accurate positional information of the target can be achieved.

The digital beam forming means (DBF process portion) 12 groups reception signals over a plurality of channels into a plurality of groups such that a desired range of detection angle can be obtained after digital beam forming.

When intervals between a plurality of antenna elements are partially unequal, the grouping into a plurality of groups is carried out such that antenna elements in resultant groups are equally spaced.

When a plurality of antenna elements are provided at unequal intervals, the grouping into a plurality of groups is carried out such that antenna elements in resultant groups are spaced as equally as possible.

Embodiment 2

Figure 8:
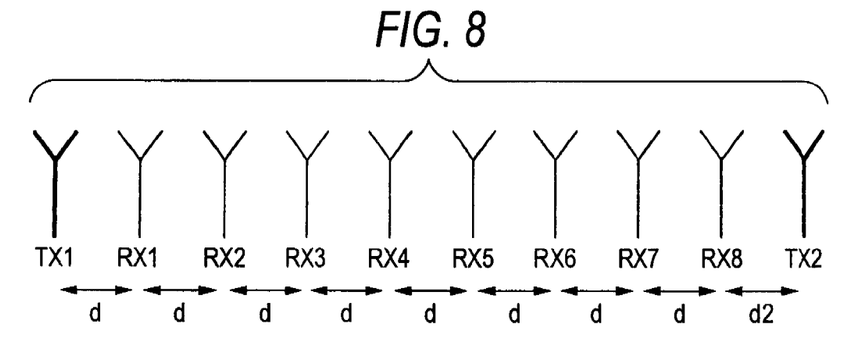
FIG. 8 illustrates a configuration of an antenna of a radar apparatus according to Embodiment 2.

FIG. 8 is a diagram showing a configuration of an antenna of a radar apparatus according to Embodiment 2.

In the present embodiment, reception antennas RX1 to RX8 for respective reception channels are disposed at equal intervals.

Since an appropriate number of inputs to an FFT process is "n-th power of 2", the description will address a case in which there are 8 ($2^3$) antennas for simplicity.

Transmission antennas TX1 and TX2 are disposed on both sides of the reception antennas at intervals which are equal to the intervals (d) between the reception channels.

The transmission antenna TX1 and the transmission antenna TX2 operate alternately (that is, the transmission antenna TX1 and the transmission antenna TX2 transmit electric waves on a time-division basis), and the reception antennas RX1 to RX8 receive electromagnetic waves returned from a target 5 as a result of reflection of the transmission waves transmitted by the respective transmission antennas.

Figure 9:
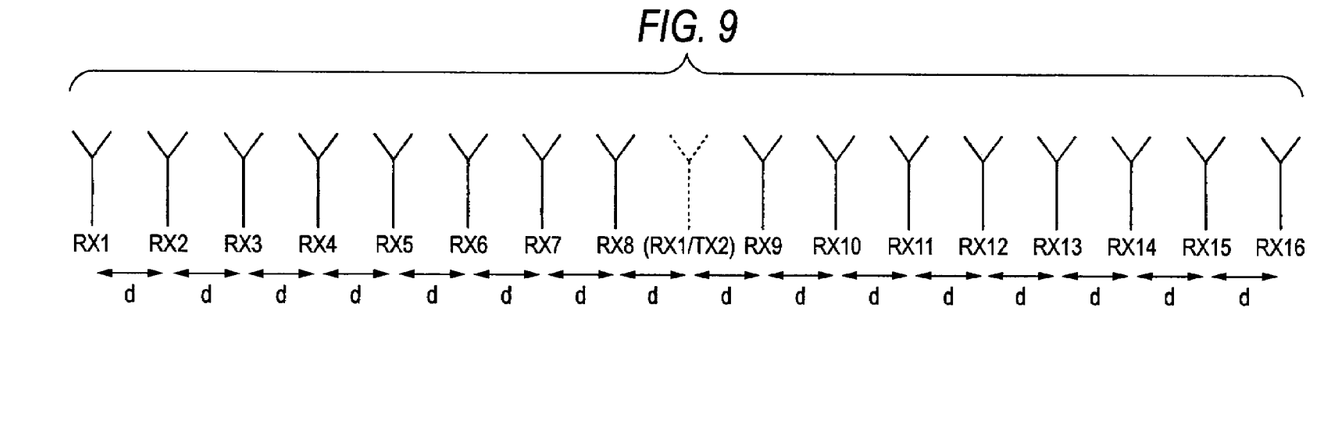
FIG. 9 illustrates a virtual antenna arrangement of the radar apparatus according to Embodiment 2.

Such a type of radar can be regarded as having a virtual channel arrangement as shown in FIG. 9 as described in JP-A-2004-198312.

In this case, the interval between the receiving channels RX8 and RX9 sandwiching the virtual transmission antennas TX1 and TX2 is unequal to the rest of the intervals which are equal to each other.

If "the interval between the TX1 and RX1" and "the interval between TX2 and RX8" are made equal to one half of the intervals between the reception channels or if d1=d2=d/2 in FIG. 9, all of the virtual reception channels can be equally spaced. However, it may not be possible to make the intervals equal to one half of the reception intervals for reasons including limitations placed by the wavelength of the transmitted waves and the shape of the antenna elements.

In such a case, the reception channels may be grouped into a group consisting of the channels RX1 to RX8 and a group consisting of channels RX9 to RX16 (that is, grouping may be carried out to group reception channels which are physically disposed into one set). Thus, the reception channels can be equally spaced, and a DBF process can therefore be replaced with an FFT process just as in Embodiment 1.

Obviously, in order to adjust the thickness of beams obtained by DBF, each of the group consisting of the channels RX1 to RX8 and the group consisting of the channels RX9 to RX16 may be further grouped into a plurality of groups.

As described above, in the present embodiment, the plurality of transmission means (transmission antennas) are provided (e.g., TX1 and TX2) in association with the reception means (reception antenna unit) 6. An electric wave is transmitted by the each transmission means (transmission antennas) 4 to the target on a time-division basis, and the reception means (reception antenna unit) 6 consequently forms virtual reception channels. The digital beam forming means 12 groups the virtual reception channels into each group consisting of actual reception channels (that is, the reception channels RX1 to RX8 which are physically disposed are grouped into one set).

Therefore, according to the present embodiment, a DBF process can be replaced with an FFT process to reduce the amount of calculation.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A radar apparatus comprising:
   transmission means for transmitting an electric wave to a target;
   reception means for obtaining reception signals over a plurality of channels from an electric wave reflected by said target;
   digital beam forming means for grouping said reception signals over a plurality of channels into a plurality of groups and performing digital beam forming on each of said plurality of groups;
   summing means for summing the amplitudes or power of frequency components obtained as a result of the digital beam forming performed on each of the plurality of groups by said digital beam forming means;
   peak detection means for detecting a peak frequency of a signal of the electric wave reflected by the target from the result of the summation by said summing means;
   distance/speed calculation means for calculating the distance and speed of the target based on the peak frequency obtained by said peak detection means; and
   angle calculation means for extracting a frequency component of the peak frequency detected by said peak detection means to calculate the angle of the electric wave reflected by said target.

2. A radar apparatus according to claim 1, wherein said angle calculation means performs ultra-resolution angle measurement such as multiple signal classification (MUSIC) to calculate the angle of the electric wave reflected by said target.

3. A radar apparatus according to claim 1, wherein said angle calculation means performs mono-pulse angle measurement based on results of the digital beam forming to calculate the angle of the electric wave reflected by said target.

4. A radar apparatus according to claim 1, wherein said digital beam forming means groups said reception signals over a plurality of channels into a plurality of groups such that a desired range of detection angles can be obtained after digital beam forming.

5. A radar apparatus according to claim 1, wherein said target and reception means comprises an antenna array having a plurality of antenna elements, and wherein when intervals between said plurality of antenna elements are partially unequal, said grouping into a plurality of groups is carried out such that antenna elements in a group obtained by the grouping are equally spaced.

6. A radar apparatus according to claim 1, wherein said target and reception means comprises an antenna array having a plurality of antenna elements, and wherein when the intervals between said plurality of antenna elements are unequal, said grouping into a plurality of groups is carried out such that antenna elements in a group obtained by the grouping are spaced as equally as possible.

7. A radar apparatus according to claim 1, wherein a plurality of said transmission means are provided in association with said reception means;

an electric wave is transmitted from each of the transmission means to said target on a time-division basis, whereby said reception means forms virtual reception channels; and said digital beam forming means groups said virtual reception channels into each group consisting of actual reception channels.

* * * * *